US005296153A

United States Patent [19]

Peachey

[11] Patent Number: 5,296,153

[45] Date of Patent: Mar. 22, 1994

[54] METHOD AND APPARATUS FOR REDUCING THE AMOUNT OF FORMATION WATER IN OIL RECOVERED FROM AN OIL WELL

[76] Inventor: Bruce R. Peachey, 10444 - 20 Avenue, Edmonton, Alberta, Canada, T6J 5A1

[21] Appl. No.: 12,916

[22] Filed: Feb. 3, 1993

[51] Int. Cl.[5] .......... B01D 21/26

[52] U.S. Cl. .......... 210/787; 210/312.1; 209/144; 209/211

[58] Field of Search .......... 210/787, 512.1; 204/144, 211

[56] References Cited

U.S. PATENT DOCUMENTS

| | | | |
|---|---|---|---|
| 2,311,963 | 2/1943 | Pyle | 103/5 |
| 2,726,606 | 12/1951 | Davidson | 103/87 |
| 2,910,002 | 10/1959 | Morgan | 103/4 |
| 3,167,019 | 1/1965 | Harris | 103/4 |
| 3,195,468 | 7/1965 | Bood | 103/87 |
| 4,241,787 | 12/1980 | Price | 166/105 |
| 4,296,810 | 10/1981 | Price | 166/265 |
| 4,544,486 | 10/1985 | Carroll | 210/512.1 |
| 4,617,031 | 10/1986 | Suh et al. | 55/52 |
| 4,738,779 | 4/1988 | Carroll et al. | 210/512.2 |
| 4,764,287 | 8/1988 | Colman et al. | 210/788 |
| 4,822,551 | 4/1989 | Prendergast | 264/275 |
| 4,836,935 | 6/1989 | Lilienthal | 210/788 |
| 4,844,817 | 7/1989 | Flanigan et al. | 210/788 |
| 4,889,475 | 12/1989 | Gannaway et al. | 417/350 |
| 4,900,445 | 2/1990 | Glanigan et al. | 210/512 |
| 4,911,850 | 3/1990 | Kalnins | 210/788 |
| 4,927,536 | 5/1990 | Worrell et al. | 210/512.2 |
| 4,933,094 | 6/1990 | Kalnins | 210/788 |
| 4,964,994 | 10/1990 | Wakley et al. | 210/512.1 |
| 4,976,872 | 12/1990 | Grey | 210/739 |
| 4,980,064 | 12/1990 | Carroll | 210/512.1 |
| 4,983,283 | 1/1991 | Grey | 210/104 |
| 5,009,784 | 4/1991 | Clarke et al. | 210/512.1 |
| 5,009,785 | 4/1991 | Webb | 210/512.2 |
| 5,017,288 | 4/1991 | Thew et al. | 210/512.1 |
| 5,021,165 | 6/1991 | Kalnins | 210/703 |
| 5,032,275 | 7/1991 | Thew | 210/512.1 |
| 5,045,218 | 9/1991 | Prendergast et al. | 210/787 |
| 5,049,277 | 9/1991 | Kalnins | 210/512.1 |
| 5,071,556 | 12/1991 | Kalnins et al. | 210/512.2 |
| 5,071,557 | 12/1991 | Schubert et al. | 210/512.2 |
| 5,093,006 | 3/1992 | Kalnins | 210/704 |
| 5,117,908 | 6/1992 | Hofmann | 166/267 |
| 5,181,836 | 1/1993 | Niemiec | 417/350 |

FOREIGN PATENT DOCUMENTS

| | | | |
|---|---|---|---|
| 2194572 | 3/1988 | United Kingdom | 43/40 |

OTHER PUBLICATIONS

Baker, A. C. and Entress, J. H. "The VASPS Subsea Separation and Pumping System", Transactions of the Institution of Chemical Engineers, vol. 70, Part A., Jan. 1992.

(List continued on next page.)

*Primary Examiner*—Robert A. Dawson
*Assistant Examiner*—David Reif Snyder
*Attorney, Agent, or Firm*—Anthony R. Lambert

[57] ABSTRACT

A method for reducing the amount of formation water in oil recovered from an oil well. Firstly, place a cyclone separator downhole in a producing oil well. The cyclone separator includes a separation chamber wherein liquids of differing densities are separated, a mixed liquids inlet through which liquids pass into the separation chamber, a first outlet for liquids of a first density to pass from the separation chamber, and a second outlet for liquids of a second density to pass from the separation chamber. Secondly, connect the first outlet to a recovery conduit extending to surface whereby a stream of mainly oil is separated in the separation chamber from the oil/water stream flowing through the mixed liquids inlet. The stream of mainly oil flowing out the first outlet and along the recovery conduit to surface. Thirdly, connect the second outlet to a disposal conduit extending to a selected disposal site whereby a stream of mainly water is separated in the separation chamber from the oil/water stream passing through the mixed liquids inlet. The stream of mainly water flowing out the second outlet and along the disposal conduit to a selected disposal site.

4 Claims, 7 Drawing Sheets

OTHER PUBLICATIONS

Young, G. A., Wakely, W. D., Taggert, D. L., Andrews, S. L., and Worrell, J. R. "Oil-Water Separation Using Hydrocyclones-An Experimental Search for Optimum Dimensions" Republication of American Filtration Society Paper Given at Baton Rouge Conference Oct. 29, 1990.

Fitzgerald, A. "New Twists Developed for Produced Water Systems" Offshore Magazine, Jan. 1992, pp. 43-44.

Modular Production Equipment Inc. Modular Protection for the Environment, Product Brochure May 1991.

Baker, A. C., Lucas-Clements, D. C. "Application of Subseq Separation and Pumping to Marginal and Deepwater Field Developments" 65th Annual Technical Conference of the Society of Petroleum Engineers New Orleans, La., Sep. 1990.

Jones, P. S. "A Field Comparison of Static and Dynamic Hydrocyclones" 65th Annual Technical Conference of the Society of Petroleum Engineers, New Orleans, La., Sep., 1990.

Choi, M. S. "Hydrocyclone Produced Water Treatment for Offshort Developments" 65th Annual Technical Conference of the Society of Petroleum Engineers, New Orleans, La., Sep., 1990.

Flanigan, D. A., Stolhand, J. E., and Shimoda, E. "Use of Low-Shear Pumps and Hydrocyclones for Improved Performance in the Cleanup of Low-Pressure Water" SPE Production Engineering, Aug. 1992.

Wojtanowicz, A. K., Xu, H "A New Method to Minimize Oilwell Production Watercut Using a Downhole Water Loop" 1992 Annual Technical Conference of the Petroleum Society of CIM, Jun., 1992, Calgary.

METHOD AND APPARATUS FOR REDUCING THE AMOUNT OF FORMATION WATER IN OIL RECOVERED FROM AN OIL WELL

BACKGROUND OF THE INVENTION

In an oil well a quantity of water is mixed with the oil which flows to surface tanks from underground formations. This water is separated from the oil and then injected back into the underground formations. A high percentage of water can make the production of oil uneconomical, due to the expense of circulating the water through a "water loop" which begins and ends in the underground formation.

The industry is currently experimenting with methods for reducing the amount of formation water in oil production. One method involves the creation of a "water sink" which alters the shape of the oil/water contact. Another method involves using biological or chemical agents as "blockers" to block off water channels in the reservoir.

An example of the "water sink" method is described in a paper by A. K. Wojtanowicz of Conoco Inc. and H. Xu of Louisiana State University in an article entitled "A New Method to Minimize Oilwell Production Watercut Using a Downhole Water Loop" published by the Petroleum Society of the Canadian Institute of Mining, Metallurgy and Petroleum as paper No. CIM 92-13. According to this method a pump is placed downhole and used to drain formation water from around the well creating the water sink. This reduces formation water produced into the well with the oil and, consequently, the water content in oil that flows to surface. The water which is pumped to create the water sink is preferably pumped a relatively short distance from one underground formation into another underground formation.

The "water sink" method proposed by Wojtanowicz and Xu relies upon having a highly porous and permeable reservoir with a single relatively stable oil/water interface. A very detailed understanding of the characteristics of the reservoir rock is required; information which is often not available. Even when the information is available, conditions favourable to the water sink method are often not present. Porosity and permeability of the rock vary considerably in some reservoirs causing a breakthrough of the water high in the producing zone. Other reservoirs have multiple oil/water contacts, making control of formation water through the water sink method impractical.

The "blocking" method, using biological or chemical agents to block off water channels in the reservoir, also has its drawbacks. It is difficult to control the blocking agents when they are injected. The treatments are expensive and often must be repeated in order to achieve the desired effect.

SUMMARY OF THE INVENTION

What is required is an alternative method for reducing the amount of formation water in oil recovered from an oil well.

According to the present invention there is provided a method for reducing the amount of formation water in oil recovered from an oil well. Firstly, place a cyclone separator downhole in a producing oil well. The cyclone separator includes a separation chamber wherein liquids of differing densities are separated, a mixed liquids inlet through which liquids pass into the separation chamber, a first outlet for liquids of a first density to pass from the separation chamber, and a second outlet for liquids of a second density to pass from the separation chamber. Secondly, connect the first outlet to a recovery conduit extending to surface whereby a stream of mainly oil is separated in the separation chamber from the oil/water stream flowing through the mixed liquids inlet. The stream of mainly oil flowing out the first outlet and along the recovery conduit to surface. Thirdly, connect the second outlet to a disposal conduit extending to a selected disposal site whereby a stream of mainly water is separated in the separation chamber from the oil/water stream passing through the mixed liquids inlet. The stream of mainly water flowing out the second outlet and along the disposal conduit to a selected disposal site.

The ability of cyclone separators to separate oil and water has been effectively demonstrated in surface applications. By adapting the cyclone separator installation for downhole use, oil wells which would otherwise be uneconomical due to their water content can be profitably exploited. Although beneficial results may be obtained through the method, as described, in oil wells in which an oil/water stream flows due to reservoir pressure; many oil wells of borderline commercial viability require the use of pumps to pump the oil/water mixture to surface. Even more beneficial results may, therefore, be obtained by connecting the first outlet of the cyclone separator to a first pump having a first fluid inlet and a first fluid outlet and connecting the second outlet of the cyclone separator to a second pump having a second fluid inlet and a second fluid outlet. Through the use of the first pump and the second pump an oil/water stream may be drawn through the cyclone separator.

The downhole connection of the cyclone separator to pumps can present difficulties. It is difficult to place two pumps in the casing of an oil well. The running of lengths of conduit to pumps positioned on surface can also present technical difficulties. Even more beneficial results may be obtained by coupling the cyclone separator, as described, with a dual stream pump. The dual steam pump includes a first pump section having a first fluid inlet and a first fluid outlet, a second pump section having a second fluid inlet and a second fluid outlet, and a single drive means acting upon fluids in both the first pump section and the second pump section. The first fluid inlet of the dual stream pump is coupled with the first outlet of the cyclone separator and the second fluid inlet of the dual stream pump is coupled with the second outlet of the cyclone separator. The first fluid outlet of the dual stream pump is connected to a recovery conduit extending to surface. The second fluid outlet of the dual stream pump is connected to a disposal conduit extending to a selected disposal site. Upon activation of the single drive means of the dual stream pump, an oil/water stream is drawn through the mixed liquids inlet of the cyclone separator, with a stream of mainly oil being separated in the separation chamber from the oil/water stream. The stream of mainly oil passes through the first outlet of the cyclone separator and is then pumped in the first fluid inlet through the first pump section, out the first fluid outlet of the dual stream pump and along the recovery conduit to the surface. A steam of mainly water is concurrently separated in the separation chamber from the oil/water stream. The stream of mainly water passes through the second outlet and then is pumped in the second fluid inlet through the second pump section, out the second fluid outlet of the dual steam pump and along the disposal conduit to the selected disposal site. It is preferred that the disposal site selected be in an adjacent underground formation, although this is not always practical.

According to another aspec of the invention there is provided an apparatus which is comprised of a combination of a cyclone separator and a dual stream pump. The cyclone separator includes a separation chamber wherein liquids of differing densities are separated, a mixed liquids inlet through which liquids pass into the separation chamber, a first outlet for liquids of a first density to pass from the separation chamber, and a second outlet for liquids of a second density to pass from the separation chamber. The dual stream pump includes a first pump section having a first fluid inlet and a first fluid outlet, a second pump section having a second fluid inlet and a second fluid outlet, and a single drive means acting upon fluids in both the first pump section and the second pump section. The first fluid inlet of the dual stream pump is coupled with the first outlet of the cyclone separator and the second fluid inlet of the dual stream pump is coupled with the second outlet of the cyclone separator. Upon activation of the single drive means fluid is drawn through the mixed liquids inlet of the cyclone separator, passing through the separation chamber to the first outlet and then pumped in the first fluid inlet through the first pump section and out the first fluid outlet of the dual stream pump. Fluid is concurrently drawn through the mixed liquids inlet of the cyclone separator, passing through the separation chamber to the second outlet and then pumped in the second fluid inlet through the second pump section and out the second fluid outlet of the dual stream pump.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

A method of reducing the amount of formation water in oil recovered from an oil well will now be described with reference to FIGS. 1 through 7.

Figure 1:
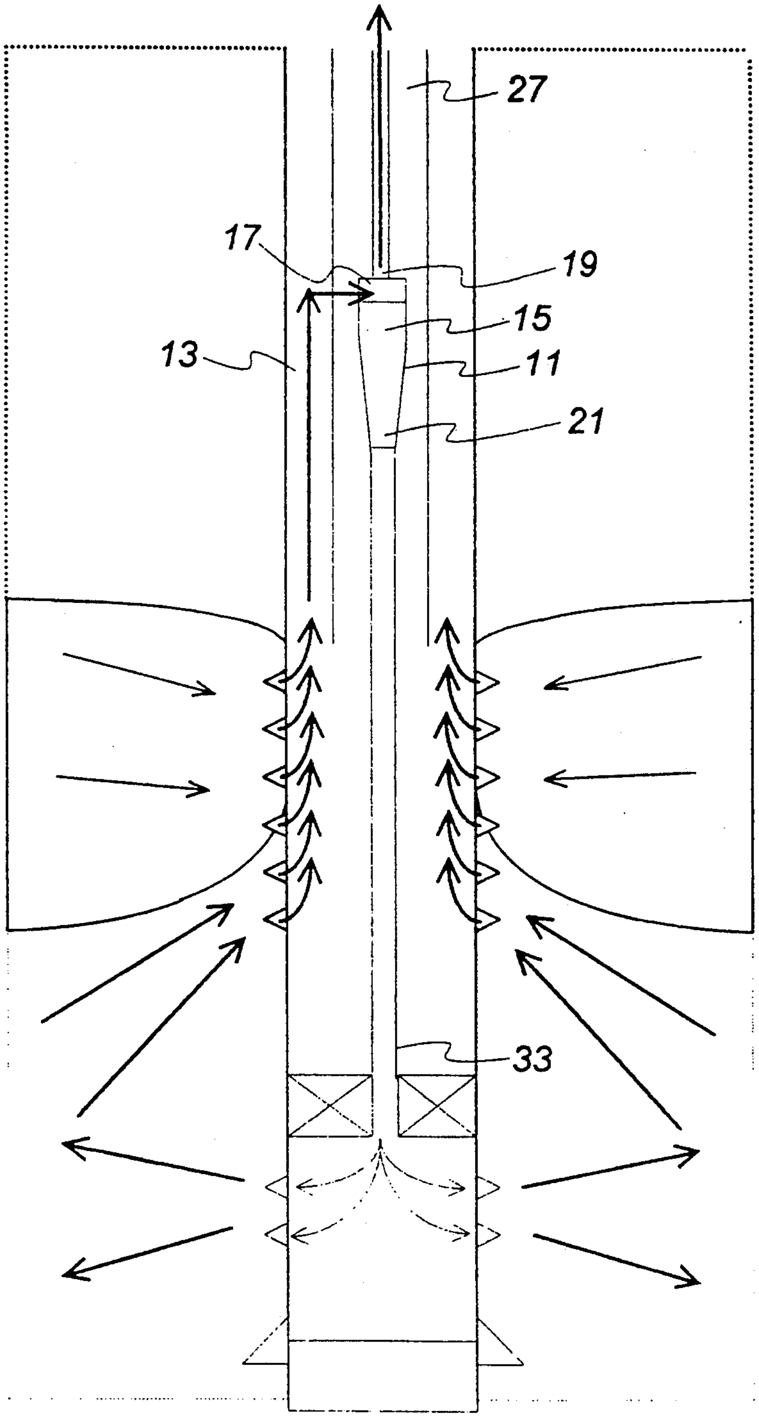
FIG. 1 is a diagram of a method for reducing the amount of formation water in oil recovered from an oil well, in a flowing well.

Referring to FIG. 1, there is illustrated a method of reducing the amount of formation water in oil recovered from an oil well. This method is suitable when an oil/water stream is flowing from the oil well as a result of reservoir pressure. Firstly, place a cyclone separator 11 downhole in an oil well 13 producing an oil/water stream. Cyclone separator 11 includes a separation chamber 15 wherein liquids of differing densities are separated, a mixed liquids inlet 17 through which liquids pass into separation chamber 15, a first outlet 19 for liquids of a first density to pass from separation chamber 15, and a second outlet 21 for liquids of a second density to pass from separation chamber 15. Secondly, connect first outlet 19 to a recovery conduit 27 extending to surface. With this configuration a stream of mainly oil is separated in separation chamber 15 from the oil/water stream passing through mixed liquids inlet 17. The stream of mainly oil flows out first outlet 19 and along recovery conduit 27 to the surface. Thirdly, connect second outlet 21 to a disposal conduit 33 extending to a selected disposal site. A stream of mainly water is separated in separation chamber 15 from the oil/water stream passing through mixed liquids inlet 17. The stream of mainly water flows out second outlet 21 and along conduit 33 to a selected disposal site. The pressure required to inject the water stream into the disposal formation is provided by the difference in hydrostatic head pressure between the column of water in conduit 33 and the mixed stream which passes through inlet 17.

Figure 2:
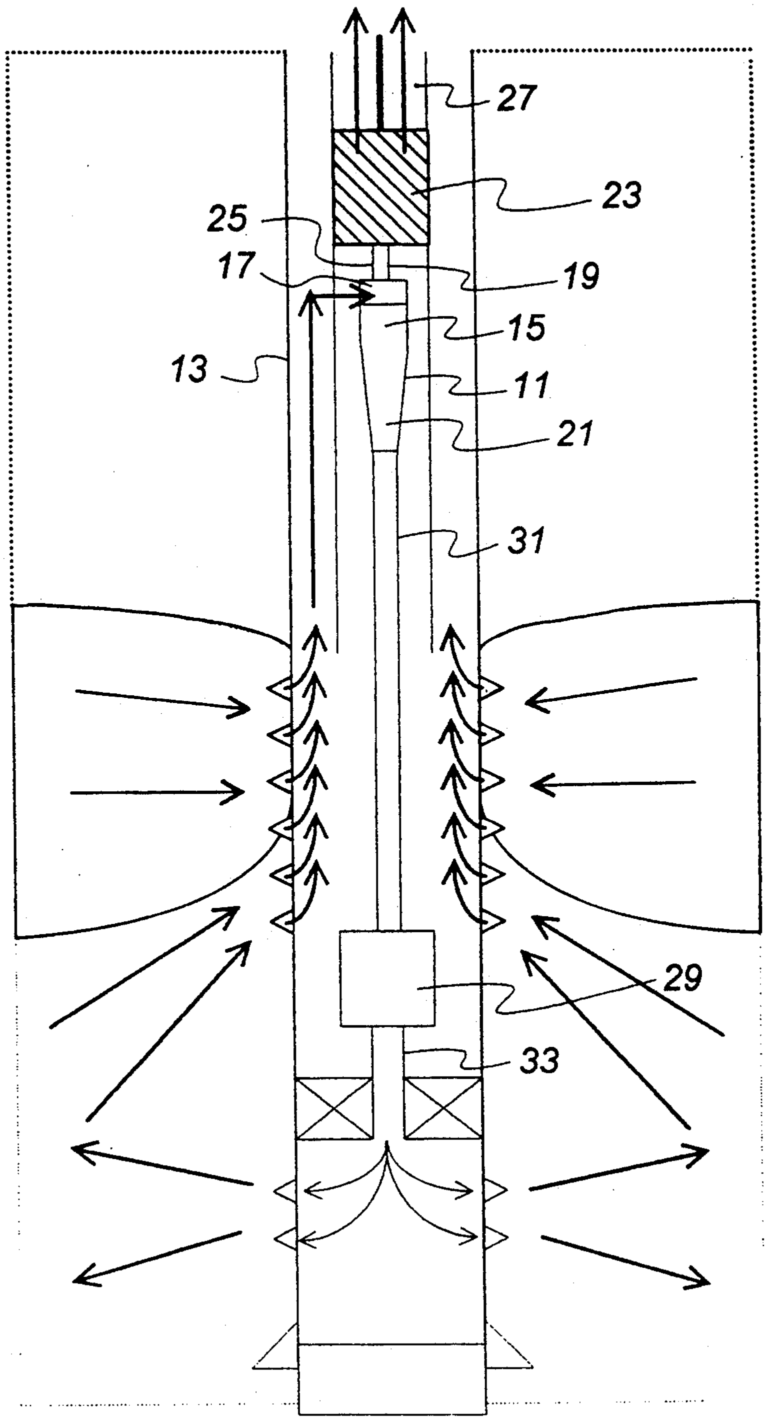
FIG. 2 is a diagram of a method for reducing the amount of formation water in oil recovered from an oil well, including two pumps.

Referring to FIG. 2, there is illustrated a method for reducing the amount of formation water in oil recovered from an oil well. This method is suitable when there is insufficient reservoir pressure to cause an oil/-water stream to flow from the oil well. Firstly, place a cyclone separator 11 downhole in an oil well 13. Cyclone separator 11 includes a separation chamber 15 wherein liquids of differing densities are separated, a mixed liquids inlet 17 through which liquids pass into separation chamber 15, a first outlet 19 for liquids of a first density to pass from separation chamber 15, and a second outlet 21 for liquids of a second density to pass from separation chamber 15. Secondly, connect first outlet 19 of cyclone separator 11 to a first pump 23 by means of connective conduit 25. First pump 23 has first fluid inlet 22 and a first fluid outlet 24. Thirdly, connect second outlet 21 of cyclone separator 11 to a second pump 29 by means of connective conduit 31. Second pump 29 has a second fluid inlet 26 and a second fluid outlet 28. Fourthly, connect first fluid outlet 22 of first pump 23 to a recovery conduit 27 extending to surface. Fifthly, connect second fluid outlet 28 of second pump 29 to a disposal conduit 33 extending to a selected disposal site. Sixthly, activate first pump 23 and second pump 29 whereby an oil/water stream is drawn through mixed liquids inlet 17 of cyclone separator 11, with a stream of mainly oil being separated in separation chamber 15 from the oil/water stream. The stream of mainly oil passes through first outlet 19 of cyclone separator and along connective conduit 25 to first pump 23. The stream of mainly oil is then pumped in first fluid inlet 22, through first pump 23, out first fluid outlet 24 and along recovery conduit 27 to the surface. A stream of mainly water is concurrently separated in separation chamber 15 from the oil/water stream. The stream of mainly water passes through second outlet 21 of cyclone separator 11 and along connective conduit 31 to second pump 29. The stream of mainly water is then pumped in second fluid inlet 26, through second pump 29, out second fluid outlet 28 and along disposal conduit 33 to the selected disposal site.

Figure 3:
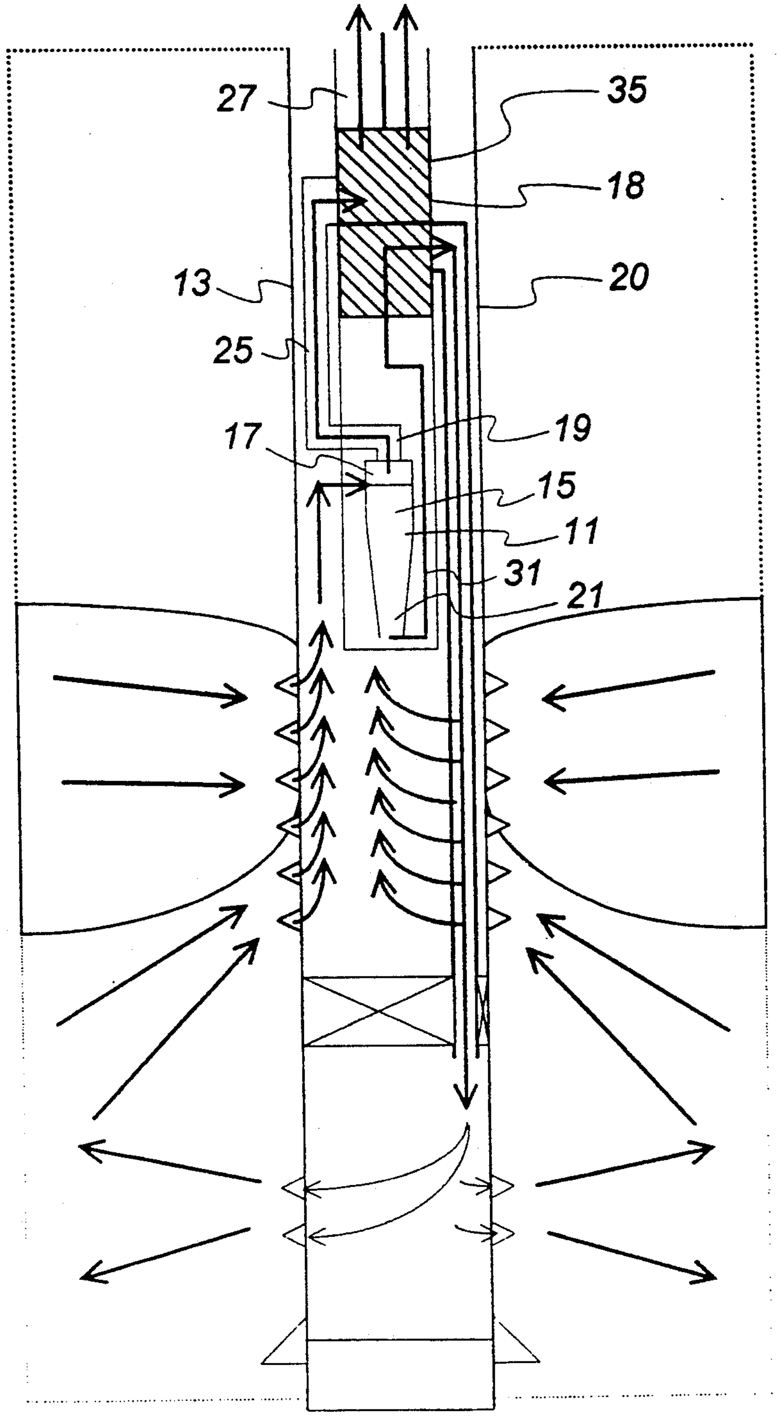
FIG. 3 is a diagram of a method for reducing the amount of formation water in oil recovered from an oil well, including a single dual stream pump.

Although beneficial results may be obtained through the method as described, the downhole connection of cyclone separator 11 to pumps can present difficulties and it is difficult to place both pumps 23 and 29 within the casing of oil well 13. Referring to FIG. 3, it is preferred that cyclone separator 11 be coupled With a single dual stream pump, generally referred to by reference numeral 35. There are a variety of alternate forms of dual stream pump which are suitable for connection to cyclone separator 11. Four alternate embodiments of dual stream pump, identified by reference numerals 10, 12, 14, and 16, respectively, will now be described with reference to FIGS. 1 through 5.

All alternate embodiments of dual stream pump, as illustrated in FIGS. 1 through 4, include a first pump section 18 and a second pump section 20. First pump section 18 has a first fluid inlet 22 and a first fluid outlet 24. Second pump section 20 has a second fluid inlet 26 and a second fluid outlet 28. Movable members, generally identified by reference numeral 30*a* and 30*b*, communicate with first pump section 18 and second pump section 20, respectively, in each of the embodiments. Movable members 30*a* and 30*b* are linked by a connecting member 40, such that they move as one. The distinguishing feature between the embodiments, as will hereinafter be further described, lies in the differences between movable members 30. A single drive means is provided for moving both of movable members 30*a* and 30*b* together. Upon movement of movable members 30*a* and 30*b* fluid is pumped in first fluid inlet 22 through first pump section 18 and out first fluid outlet 24 while fluid is concurrently pumped in second fluid inlet 26 through second pump section 20 and out second fluid outlet 28.

Figure 4:
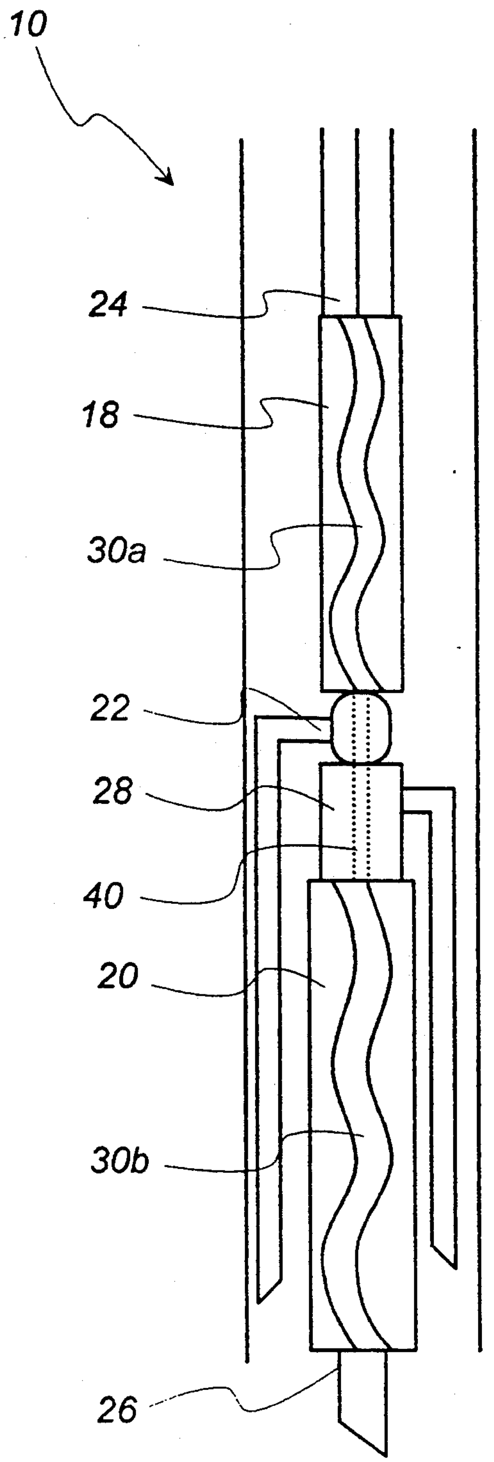
FIG. 4 is a longitudinal section view of a dual stream rotating positive displacement pump.

Referring to FIG. 4, dual stream pump 10 is a rotating positive displacement pump. In this embodiment first pump section 18 and second pump section 20 are stator sections. Movable member 30*a* is a first rotor member positioned within first pump section 18. Movable member 30*b* is a second rotor member disposed in second pump section 20. Second rotor member 30*b* is rotatably coupled to first rotor member 30*a* by connecting member 40, such that upon rotation of first rotor member 30*a*, second rotor member 30*b* rotates. A single rotary drive rotates both rotor members 30*a* and 30*b*. The use and operation of dual stream pump is similar in principle to a single stream rotating displacement pump. The single drive rotates rotor members 30*a* and 30*b* which draw liquids through respective first pump section 18 and second pump section 20.

Figure 5:
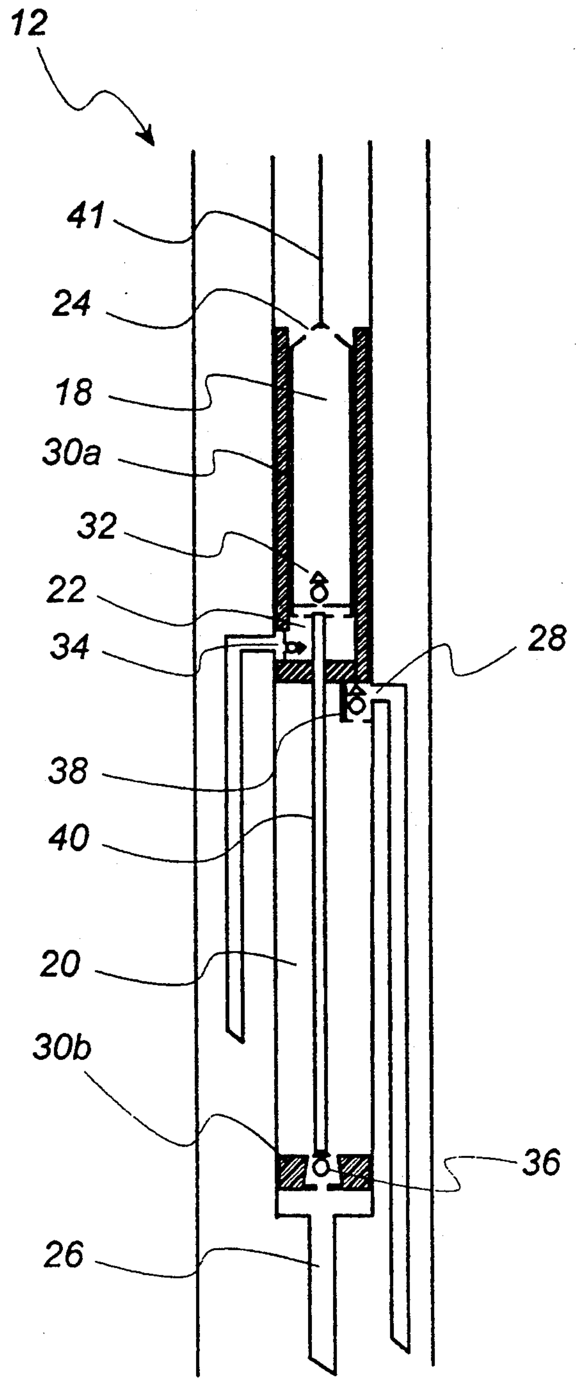
FIG. 5 is a longitudinal section view of a dual stream reciprocating positive displacement pump.

Referring to FIG. 5 dual stream pump 12 is a reciprocating positive displacement pump. Movable member 30*a* is in the form of a reciprocating piston member disposed in first pump section 18. Movable member 30*b* is, similarly, in the form of a reciprocating piston member disposed in second pump section 20. Piston member 30*a* and 30*b* are connected together by connecting member 40 and move as one. Piston members 30*a* and 30*b* have valves 32, 34 and 36, 38, respectively, which open and close as piston members 30*a* and 30*b* reciprocate. A single sucker rod 41 attached to a single drive means is used for reciprocally moving both of piston members 30*a* and 30*b*. In use and operation valves 32 and 36 open as piston members 30*a* and 30*b* move in a downwardly direction permitting liquid to enter piston members 30*a* and 30*b*. As piston members 30*a* and 30*b* move in an upwardly direction valves 32 and 36 close, trapping liquid within piston members 30*a* and 30*b*. Valves 34 and 38, respectively, open as piston members 30*a* and 30*b* move upwardly. The opening of valve 38 permits liquid to exit second pump section 20 through second fluid outlet 28. The opening of valve 34 permits liquid to enter first pump section 18 through first fluid inlet 22.

Figure 6:
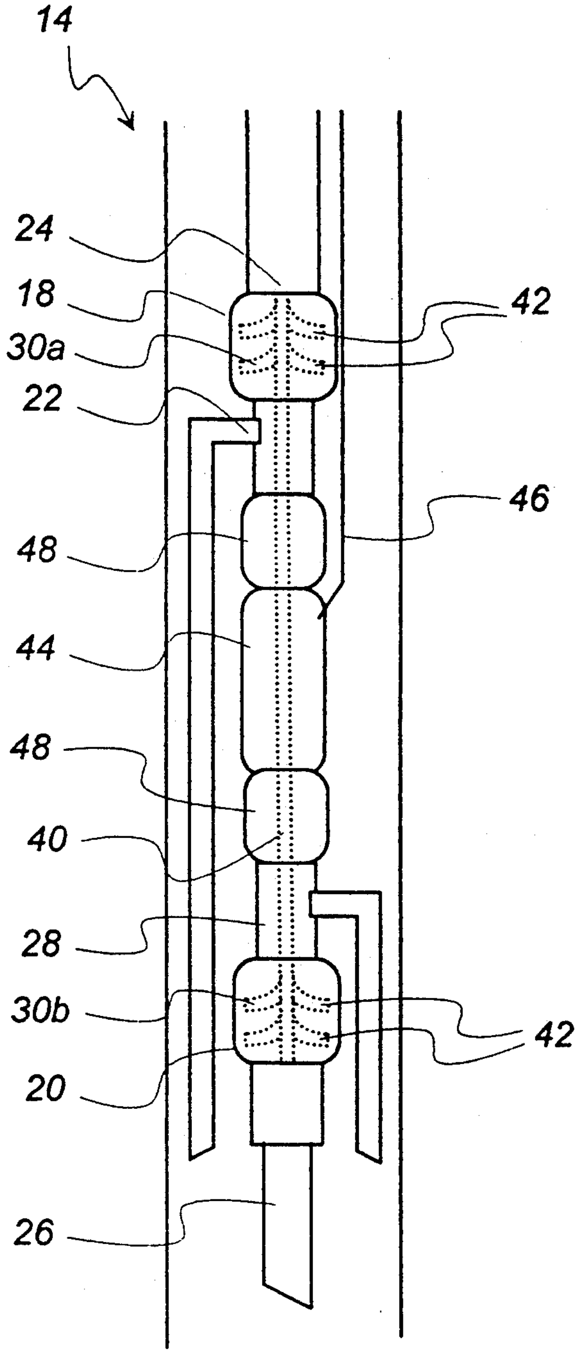
FIG. 6 is a longitudinal section view of a dual stream electric submersible centrifugal pump.

Referring to FIG. 6, dual stream pump 14 is an electric submersible centrifugal pump. Movable member 30*a* is in the form of an impeller shaft having a plurality of impeller blades 42. Movable member 30*b* is, similarly, in the form of an impeller shaft having a plurality of impeller blades 42. Movable members 30*a* and 30*b* are connected by connecting member 40, such that upon rotation of movable member 30*a*, movable member 30*b* rotates. A single electric submersible motor 44 is used as the single drive means which rotates both movable members 30*a* and 30*b*. Motor 44 receives power from the surface via a power cable 46. Motor seal sections 48 located between motor 44 and pump sections 18 and 20, protect motor 44 from damage due to incursion of liquids. It will be appreciated that motor 44 can be located either between pump sections 18 and 20, or at an end of one of the pump sections. The use and operation of dual stream pump 14 is similar in principle to a single stream electric submersible centrifugal pump. Motor 44 rotates members 30*a* and 30*b*, and the action of impeller blades 42 draw liquids through the respective pump sections 18 and 20.

Figure 7:
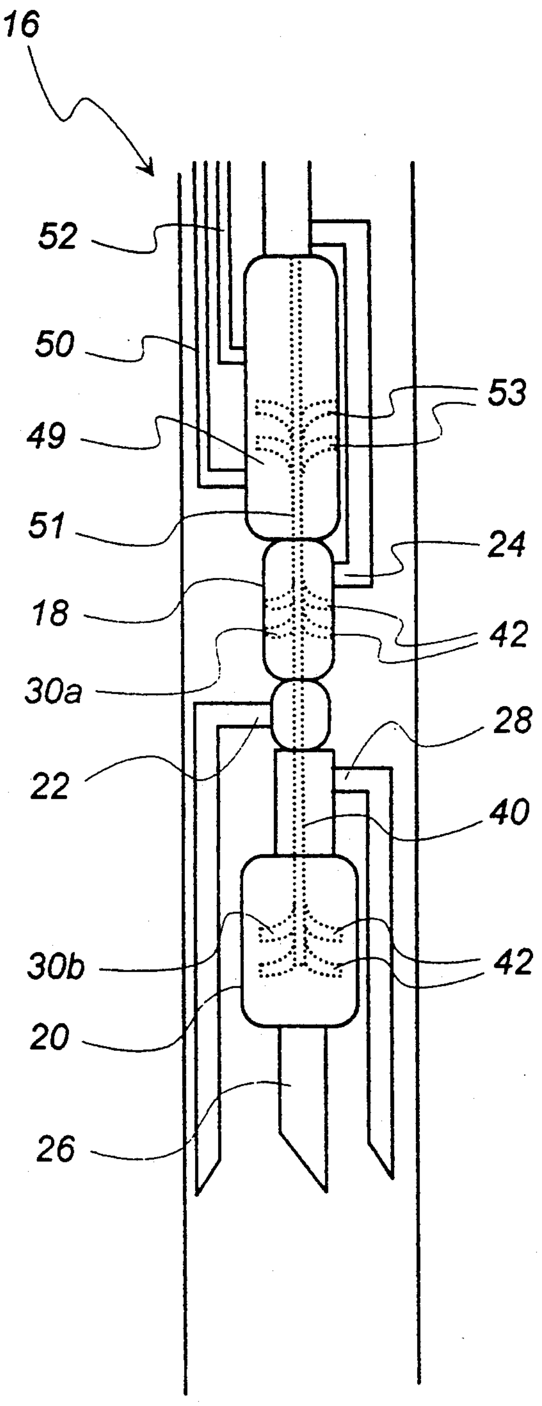
FIG. 7 is a longitudinal section view of a dual stream hydraulic turbine centrifugal pump.

Referring to FIG. 7, dual stream pump 16 is an hydraulic turbine centrifugal pump. Movable member 30*a* is in the form of an impeller shaft having a plurality of impeller blades 42. Movable member 30*b* is, similarly, in the form of an impeller shaft having a plurality of impeller blades 42. Movable members 30*a* and 30*b* are connected by connecting member 40, such that upon rotation of movable member 30*a* , movable member 30*b* rotates. A single hydraulic turbine motor 49 is coupled to and serves to rotate both movable members 30*a* and 30*b*. Motor 49 has an inlet tubing 50, an outlet tubing 52, and a shaft 51 with fluid vanes 53. Motor 49 is powered from the surface by hydraulic fluid pumped through inlet tubing 50 past fluid vanes 53 and back through outlet tubing 52. It will be appreciated that motor 49 can be located either between pump sections 18 and 20, or at an end of one of the pump sections. The use and operation of dual stream pump 16 is similar in principle to a single hydraulic turbine centrifugal pump. The flow of hydraulic fluid past fluid vanes 53 rotates motor 49, which in turn causes a rotation of members 30*a* and 30*b*. Upon rotation of movable members 30*a* and 30*b*, the action of impeller blades 42 draws liquids through the respective pump sections 18 and 20.

When coupling cyclone separator 11 to dual stream pump 35, first fluid inlet 22 of dual stream pump 35 is coupled by means of conduit 25 with first outlet 19 of cyclone separator 11. Second fluid inlet 26 of dual stream pump 35 is coupled by means of conduit 31 with second outlet 21 of cyclone separator 11. Cyclone separator 11 with attached dual stream pump 35 is placed downhole in producing oil well 13. Upon activation of the single drive means an oil/water mixture is drawn through the mixed liquids inlet 17 of cyclone separator 11. Oil passes through separation chamber 15 to first outlet 19 and then is pumped in first fluid inlet 22 through first pump section 18 and out first fluid outlet 24 of dual stream pump and then by means of conduit 27 to oil storage positioned at surface. Water concurrently passes through separation chamber 15 to second outlet 21 and then is pumped in second fluid inlet 26 through second pump section 20 and out second fluid outlet 28 of dual steam pump 35 to a water disposal site in a selected underground water injection zone.

It will be apparent to one skilled in the art that modifications may be made to the illustrated embodiments without departing from the spirit and scope of the invention as defined by the claims.

THE EMBODIMENTS OF THE INVENTION IN WHICH A EXCLUSIVE PROPERTY OR PRIVILEGE IS CLAIMED ARE DEFINED AS FOLLOWS:

1. A method for reducing the amount of formation water in oil recovered from an oil well, comprising the steps of:
 a. firstly, placing a cyclone separator downhole in an oil well producing an oil/water stream, the cyclone separator including:
  a separation chamber wherein liquids of differing densities are separated;
  a mixed liquids inlet through which liquids pass into the separation chamber;
  a first outlet for liquids of a first density to pass from the separation chamber;
  a second outlet for liquids of a second density to pass from the separation chamber;
 b. secondly, connecting the first outlet to a recovery conduit extending to surface whereby a stream of mainly oil is separated in the separation chamber from the oil/water stream passing through the mixed liquids inlet, the stream of mainly oil flowing out the first outlet and up the recovery conduit to the surface; and
 c. thirdly, connecting the second outlet to a disposal conduit extending to a selected disposal site whereby a stream of mainly water is separated in the separation chamber from the oil/water stream passing through the mixed liquids inlet, the stream of mainly water flowing out the second outlet and along the disposal conduit to the selected disposal site.

2. A method for reducing the amount of formation water in oil recovered from an oil well, comprising the steps of:
 a. firstly, placing a cyclone separator downhole in an oil well, the cyclone separator including:
  a separation chamber wherein liquids of differing densities are separated;
  a mixed liquids inlet through which liquids pass into the separation chamber;
  a first outlet for liquids of a first density to pass from the separation chamber;
  a second outlet for liquids of a second density to pass from the separation chamber;
 b. secondly, connecting the first outlet of the cyclone separator to a first pump having a first fluid inlet and a first fluid outlet;
 c. thirdly, connecting the second outlet of the cyclone separator to a second pump having a second fluid inlet and a second fluid outlet; and
 d. fourthly, connecting the first fluid outlet of the first pump to a recovery conduit extending to surface;
 e. fifthly, connecting the second fluid outlet of the second pump to a disposal conduit extending to a selected disposal site; and
 f. sixthly, activating the first pump and the second pump whereby an oil/water stream is drawn through the mixed liquids inlet of the cyclone separator, with a stream of mainly oil being separated in the separation chamber from the oil/water stream, the stream of mainly oil passing through the first outlet of the cyclone separator and then being pumped in the first fluid inlet through the first pump, out the first fluid outlet and along the recovery conduit to the surface, with a stream of mainly water concurrently being separated in the separation chamber from the oil/water stream, the stream of mainly waste passing through the second outlet and then being pumped in the second fluid inlet, through the second pump, out the second fluid outlet and along the disposal conduit to the selected disposal site.

3. A method for reducing the amount of formation water in oil recovered from an oil well, comprising the steps of:
 a. firstly, placing a cyclone separator/dual stream pump combination downhole in an oil well, the cyclone separator including:
  a separation chamber wherein liquids of differing densities are separated;
  a mixed liquids inlet through which liquids pass into the separation chamber;
  a first outlet for liquids of a first density to pass from the separation chamber;
  a second outlet for liquids of a second density to pass from the separation chamber; the dual steam pump including:
  a first pump section having a first fluid inlet and a first fluid outlet;
  a second pump section having a second fluid inlet and a second fluid outlet; and
  a single drive means acting upon fluids in both the first pump section and the second pump section;
  the first fluid inlet of the dual stream pump being coupled with the first outlet of the cyclone separator and the second fluid inlet of the dual stream pump being coupled with the second outlet of the cyclone separator;
 b. secondly, connecting the first fluid outlet of the dual stream pump to a recovery conduit extending to surface;
 c. thirdly, connecting the second fluid outlet of the dual stream pump to a disposal conduit extending to a selected disposal site; and
 d. fourthly, activating the single drive means of the dual stream pump whereby an oil/water stream is drawn through the mixed liquids inlet of the cyclone separator, with a stream of mainly oil being separated in the separation chamber from the oil/water stream, the stream of mainly oil passing through the first outlet of the cyclone separator and then being pumped in the first fluid inlet through the first pump section, out the first fluid outlet of the dual stream pump and along the recovery conduit to the surface, with a stream of mainly water concurrently being separated in the separation chamber from the oil/water stream, the stream of mainly water passing through the second outlet and then being pumped in the second fluid inlet through the second pump section, out the second fluid outlet of the dual steam pump and along the disposal conduit to the selected disposal site.

4. An apparatus comprising, in combination:
 a. a cyclone separator including:
  a separation chamber wherein liquids of differing densities are separated;

a mixed liquids inlet through which liquids pass into the separation chamber;

a first outlet for liquids of a first density to pass from the separation chamber;

a second outlet for liquids of a second density to pass from the separation chamber; and b. a dual stream pump including:

i. a first pump section having a first fluid inlet and a first fluid outlet;

ii. a second pump section having a second fluid inlet and a second fluid outlet; and iii. a single drive means acting upon fluids in both the first pump section and the second pump section;

c. the first fluid inlet of the dual stream pump being coupled with the first outlet of the cyclone separator and the second fluid inlet of the dual stream pump being coupled with the second outlet of the cyclone separator, such that upon activation of the single drive means fluid is drawn through the mixed liquids inlet of the cyclone separator, passing through the separation chamber to the first outlet and then pumped in the first fluid inlet through the first pump section and out the first fluid outlet of the dual stream pump while fluid is concurrently drawn through the mixed liquids inlet of the cyclone separator, passing through the separation chamber to the second outlet and then pumped in the second fluid inlet through the second pump section and out the second fluid outlet of the dual stream pump.

* * * * *